United States Patent
Fung et al.

(10) Patent No.: US 9,314,133 B2
(45) Date of Patent: Apr. 19, 2016

(54) GRILL PLATE AND HINGE STRUCTURES

(71) Applicant: CONAIR CORPORATION, Stamford, CT (US)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 313 days.

(21) Appl. No.: 13/957,699

(22) Filed: Aug. 2, 2013

(65) Prior Publication Data

US 2015/0033953 A1 Feb. 5, 2015

(51) Int. Cl.
*A47J 37/00* (2006.01)
*A47J 37/06* (2006.01)

(52) U.S. Cl.
CPC ...... *A47J 37/0611* (2013.01); *A47J 2037/0617* (2013.01); *Y10T 29/49002* (2015.01)

(58) Field of Classification Search
CPC .................. A47J 2037/0617; A47J 37/0611
USPC .................................. 99/379, 372, 377, 380
See application file for complete search history.

(56) References Cited

U.S. PATENT DOCUMENTS

| | | |
|---|---|---|
| 2,033,060 A | 3/1936 | Anderson |
| 2,057,501 A | 10/1936 | Parr |
| 2,607,287 A | 8/1952 | Price |
| 2,719,903 A | 10/1955 | Oertli |
| 4,036,995 A | 7/1977 | Koether et al. |
| 4,088,067 A | 5/1978 | Kaebitzsch et al. |
| 4,206,345 A | 6/1980 | Maass et al. |
| 4,697,504 A | 10/1987 | Keating |
| 5,237,914 A | 8/1993 | Carstensen |
| 5,467,696 A | 11/1995 | Everhart |
| 5,531,155 A | 7/1996 | Pellicane et al. |
| 5,712,466 A | 1/1998 | Spicer |
| 5,758,568 A | 6/1998 | Moravec |
| 5,848,567 A | 12/1998 | Chiang |
| 5,992,302 A | 11/1999 | Geisler |
| 6,062,130 A | 5/2000 | Brady |
| D436,498 S | 1/2001 | Carlson et al. |
| 6,389,959 B1 | 5/2002 | Robertson |
| 6,439,108 B1 * | 8/2002 | Wu ................................ 99/349 |
| 6,484,624 B1 * | 11/2002 | Wu ................................ 99/339 |
| RE37,988 E | 2/2003 | Uss |
| 6,539,842 B1 | 4/2003 | Chapman et al. |
| 6,591,740 B1 | 7/2003 | Hsu |
| 6,595,116 B1 * | 7/2003 | Lin ................................. 99/349 |
| 6,705,306 B1 | 3/2004 | Dickey |
| 7,514,655 B2 | 4/2009 | Fernandez et al. |
| 7,608,803 B2 | 10/2009 | Jerovsek |
| 7,717,028 B2 | 5/2010 | Serra |
| 8,122,816 B2 | 2/2012 | Yu |
| 8,261,657 B2 | 9/2012 | Serra et al. |
| 2004/0074398 A1 | 4/2004 | Griffin et al. |
| 2005/0139086 A1 | 6/2005 | McHutchison |
| 2009/0165774 A1 | 7/2009 | Johnston et al. |

(Continued)

*Primary Examiner* — Reginald L Alexander
(74) *Attorney, Agent, or Firm* — Grogan, Tuccillo & Vanderleeden, LLP (57) ABSTRACT

A cooking appliance includes a lower housing having a first heating plate, a pair of opposed frame members operatively connected to the lower housing, the frame members including a guide track formed therein, and an upper housing having a second heating plate and a guiding wheel on opposed sides of the upper housing. The guiding wheel is received in the guide track such that the upper housing is selectively movable along the guide track.

16 Claims, 11 Drawing Sheets

(56) References Cited

U.S. PATENT DOCUMENTS

2010/0186601 A1* 7/2010 Gulkanat ................... 99/372
2012/0090476 A1* 4/2012 Wang et al. .................... 99/379
2012/0137897 A1 6/2012 Tahincioglu

* cited by examiner

GRILL PLATE AND HINGE STRUCTURES

FIELD OF THE INVENTION

The present invention relates to cooking appliances and, more particularly, improvements in a grill plate and hinge structures for a cooking appliance.

BACKGROUND OF THE INVENTION

Cooking appliances, and in particular electric cooking/grilling devices such as griddles, are known. One type of known grilling devices typically evidences a lower housing having a lower heating plate and an upper housing having an upper heating plate, wherein the heating plates are typically heated by an electrical resistance heater. A handle attached to the upper housing allows a user to elevate the upper relative to the lower housing to accommodate a food item therebetween to be heated. The food item typically rests on the lower heating plate while the upper heating plate is lowered on top of the food item, such that both sides of the food item are heated simultaneously, thereby cutting down on cooking time.

While existing grilling devices are generally suitable for what is regarded as ordinary performance, there is room for improvement in terms of functionality, ease of use and ergonomics. In particular, existing grilling devices are typically capable of performing only a small number of functions, thereby limiting the types of food items that can be heated or cooked or limiting the types of heating or cooking that can be accomplished.

SUMMARY OF THE INVENTION

It is an object of the present invention to provide improvements in a grill plate and hinge structures for a cooking appliance.

It is an object of the present invention to provide improvements in a grill plate and hinge structures for a cooking appliance that enables the cooking appliance to perform a variety of functions.

It is an object of the present invention to provide improvements in a grill plate and hinge structures for a cooking appliance that facilitates the smooth movement of an upper housing relative to the lower housing.

It is an object of the present invention to provide improvements in a grill plate and hinge structures for a cooking appliance that allows for single-hand operation.

It is an object of the present invention to provide improvements in a grill plate and hinge structures for a cooking appliance that ensures even pressing force on a food item.

It is an object of the present invention to provide improvements in a grill plate and hinge structures for a cooking appliance that allows an upper housing and upper heating plate to be releasably locked in predetermined positions relative to a lower heating plate.

These and other objects are achieved by the present invention.

According to an embodiment of the present invention, a cooking appliance is provided. The cooking appliance includes a lower housing having a first heating plate, a pair of opposed frame members operatively connected to the lower housing, the frame members including a guide track formed therein, and an upper housing having a second heating plate and a guiding wheel on opposed sides of the upper housing. The guiding wheel is received in the guide track such that the upper housing is selectively movable along the guide track.

In another embodiment, a cooking appliance is provided. The cooking appliance includes an upper housing, a lower housing, and a positioning means for selectively adjusting and maintaining a spacing between said upper housing and said lower housing.

According to yet another embodiment of the present invention, a method of operating a cooking appliance having a lower housing having a first heating surface and an upper housing having a second heating surface is provided. The method includes the step of, said operatively connecting the upper housing with the lower housing such that the upper housing is movable relative to the lower housing within a substantially 'n' shaped guide track.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
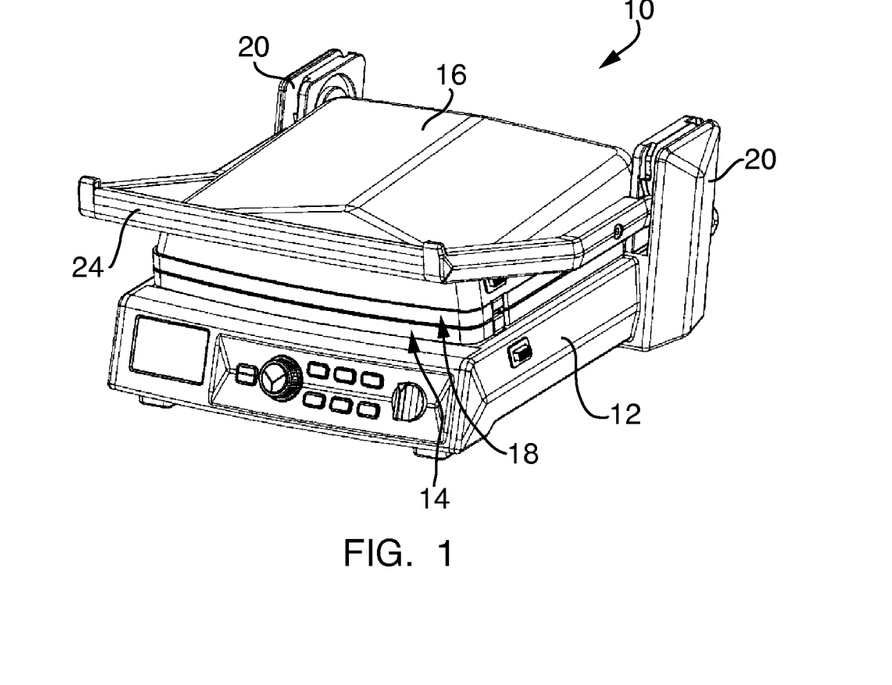
FIG. 1 is a perspective front view of a cooking appliance having improvements in a grill plate and hinge structures according to an embodiment of the present invention.
Figure 2:
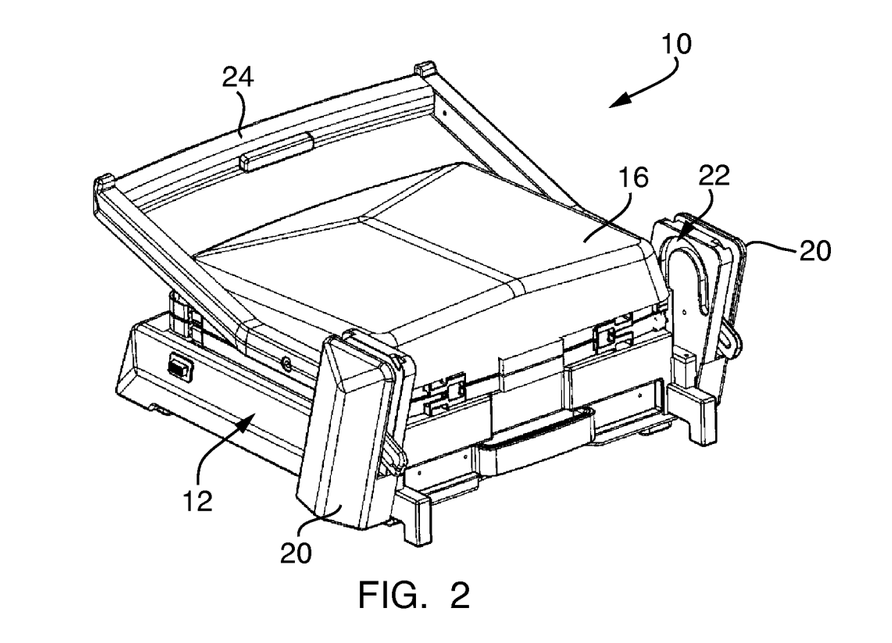
FIG. 2 is a perspective rear view of the cooking appliance of FIG. 1.

Referring to FIGS. 1 and 2, a cooking appliance according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. As best shown in FIG. 2, the upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12, as discussed in detail below.

Figure 3:
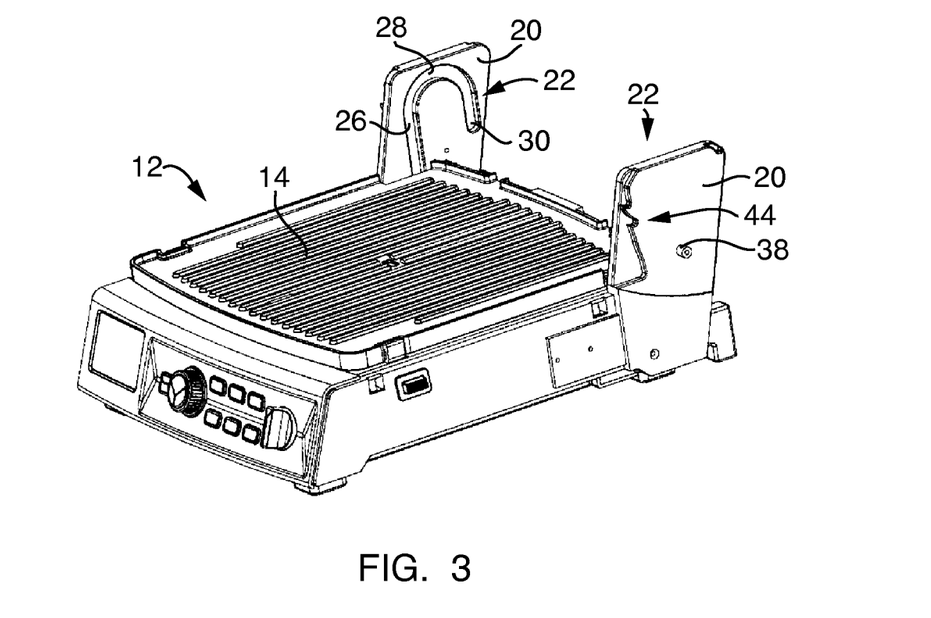
FIG. 3 is a perspective front view of a lower housing of the cooking appliance of FIG. 1, illustrating a guide track in accordance with an embodiment of the present invention.
Figure 4:
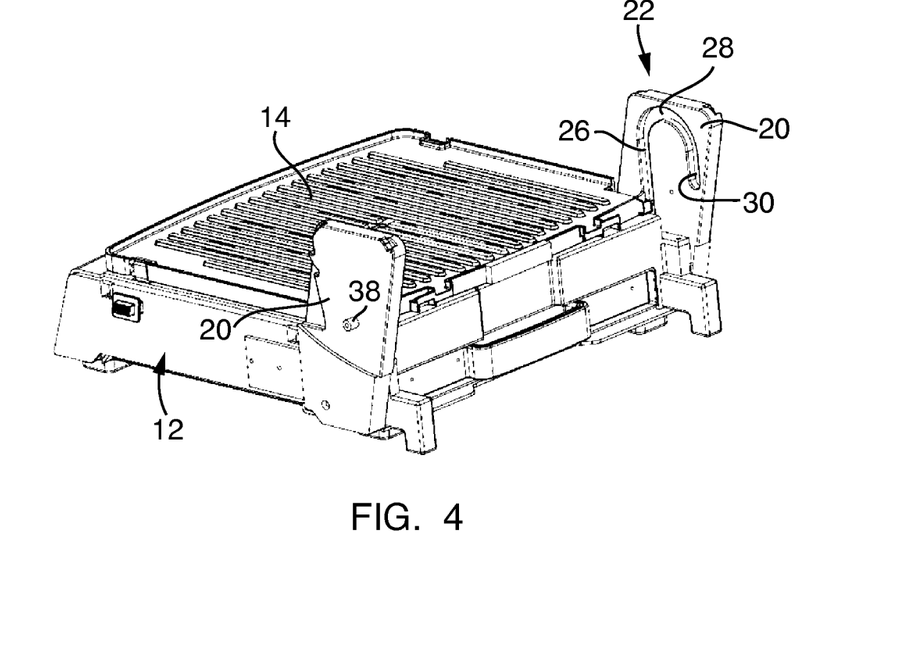
FIG. 4 is a perspective rear view of the lower housing of the cooking appliance of FIG. 1.

With reference to FIGS. 3 and 4, the lower housing 12 and the guide track 22 is best shown. The guide track 22 is shaped like a lowercase 'n' and includes a substantially vertical first portion 26, an arcuate second portion 28 and a substantially vertical third portion 30. As shown therein, the guide track 22 is formed as a recess or cutout in the interior faces of the frame members 20.

Figure 5:
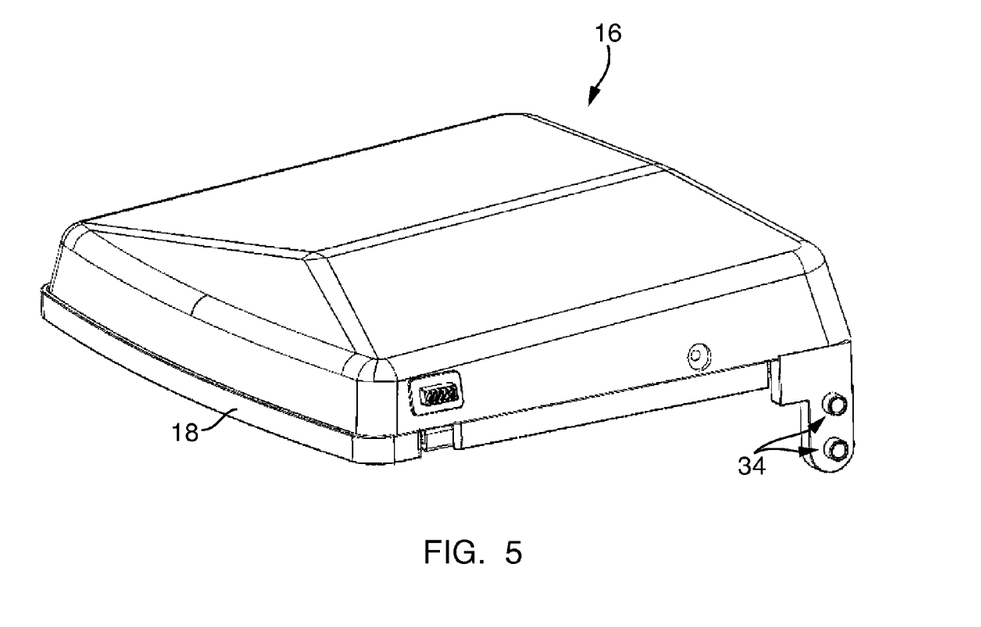
FIG. 5 is a perspective front view of an upper housing of the cooking appliance of FIG. 1.
Figure 6:
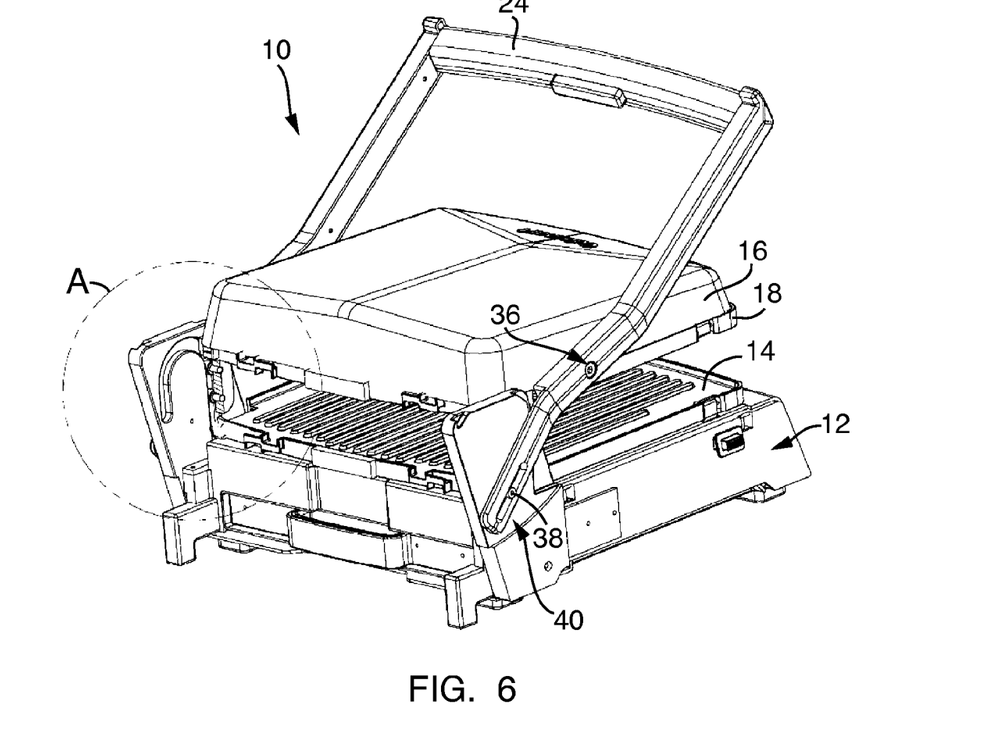
FIG. 6 is a perspective rear view of the cooking appliance of FIG. 1, illustrating the upper housing in spaced relation to the lower housing.
Figure 7:
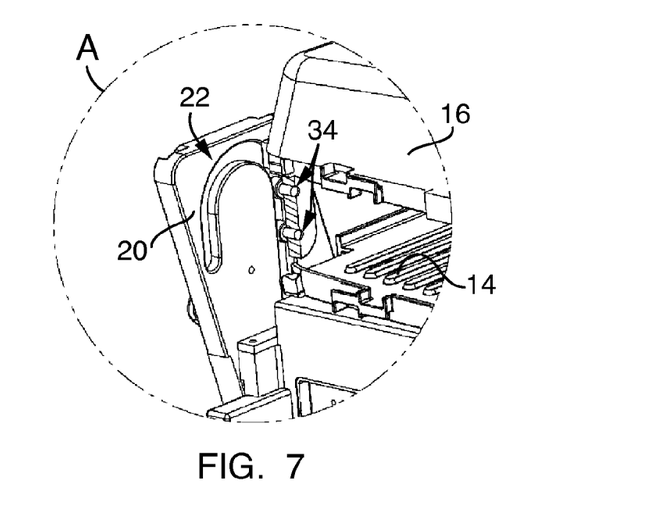
FIG. 7 is an enlarged, detail view of area A of FIG. 6.

Turning now to FIG. 5, the upper housing 16 is shown. The upper housing 16 includes a pair of inverted 'L' shaped arms 32 extending downwards from opposing rear sides of the housing 16. The arms 32 include a pair of stacked guiding wheels or protrusions 34 extending outwards from the arm 32. The guiding wheels or protrusions 34 are sized and shaped so as to fit within the guide track 22 of the lower base 12, as best shown in FIGS. 6 and 7. Importantly, the shape of the guide track 22 therefore controls the trajectory of movement of the upper housing 16 relative to the lower housing 12, as the projections 34 ride within the 'n' shaped guide track 22. As will be readily appreciated, the purpose of such predefined trajectory defined by the guide track 22 is to allow a user to selectively and conveniently position the upper heating plate 18 at various positions, in order to perform different functions.

With further reference to FIG. 6, smooth movement of the upper housing 16 along the guide track 22 also relies on a linkage between the handle 24 and the upper housing 16 and lower housing 12, respectively. In particular, the handle 24 is pivotally connected to opposed sides of the upper housing 16 through a hinge 36. The hinge 36 connects the opposed legs of the handle 24 to the sides of the upper housing 16 at approximately a midpoint thereof. The handle 24 is also connected to the lower housing 12 through a slot and pin connection. In particular, the frame members 20 each include a small projection 38 that extends outward from the frame members 20. As shown in FIG. 6, the projections 38 are received in slots 40 formed in the distal ends of the opposed legs of the handle 24.

Turning now to FIGS. 8-16, selective movement of the cooking appliance 10 between various positions is shown.

Figure 8:
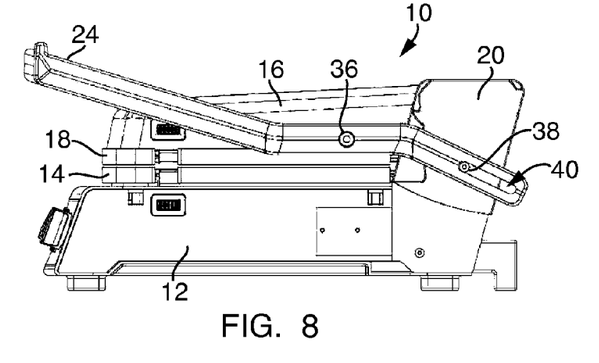
FIG. 8 is a side, elevational view of the cooking appliance of FIG. 1, illustrating the upper grill plate in a closed position.

FIG. 8 illustrates the cooking appliance 10 in a closed position in which the upper heating plate 18 contacts the lower heating plate 14. In this position, the projection 38 is in the forward-most position in the slot 40.

Figure 9:
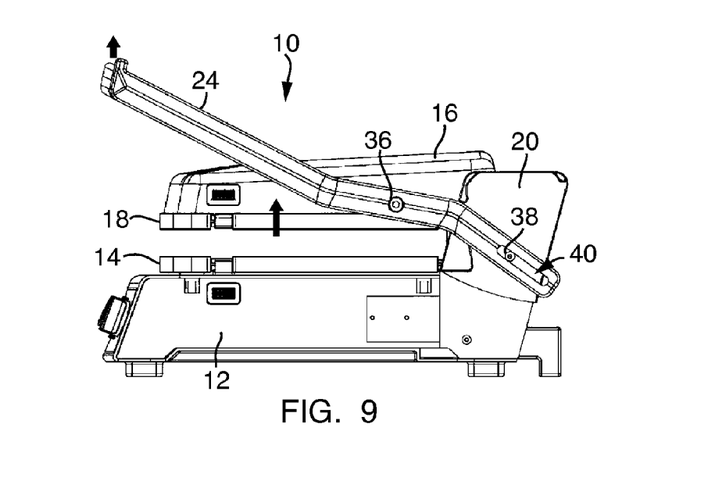
FIG. 9 is a side, elevational view of the cooking appliance of FIG. 1, illustrating the upper grill plate in a first raised position.
Figure 10:
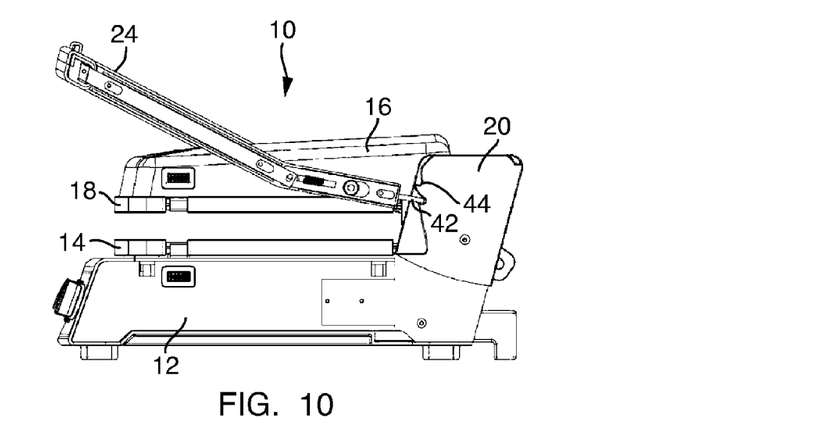
FIG. 10 is a side, elevational view of the cooking appliance of FIG. 1, illustrating the upper grill plate in a first raised and locked position.

As shown in FIG. 9, in operation, lifting up on the handle 24 in the direction of arrow A causes the upper housing 16 to lift upwards, as the guiding wheels 34 ride in the substantially vertical first portion 26 of the guide track 22. Importantly, as the first portion 26 of the guide track 22 is oriented substantially vertically, and as the upper housing 16 is pivotally connected to the handle 24 via the hinge 36, movement of upper housing 16 within the first portion 26 is substantially vertical. As a result, the upper heating plate 18 remains substantially parallel to the lower heating plate 14 through at least the approximately 1 inch elevated position shown in FIG. 9. As shown in FIG. 10, the upper housing 16 may be retained at this first elevated position via the selective engagement of an extendable/retractable pin 42 of the handle 24 with position stops 44 formed on the frame members 20, as discussed in detail hereinafter.

Figure 11:
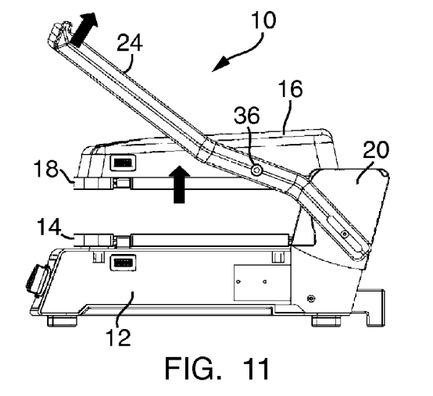
FIG. 11 is a side, elevational view of the cooking appliance of FIG. 1, illustrating the upper grill plate in a second raised position.
Figure 12:
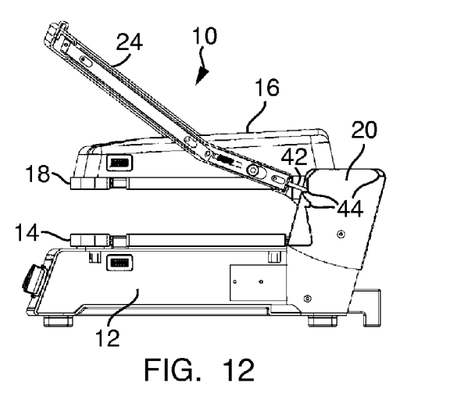
FIG. 12 is a side, elevational view of the cooking appliance of FIG. 1, illustrating the upper grill plate in a second raised and locked position.

With reference to FIGS. 11 and 12, further lifting of the handle 24 by a user causes the upper housing 16 to travel further upwards, still within the vertical first portion 26 of the guide track 22. As shown in FIG. 12, the upper housing 16 may be retained at this second, approximately 2 inch, elevated position via engagement of the pin 42 with the positions stops 44, as discussed below. Importantly, this substantially vertical movement of the upper housing 16 and upper heating plate 18, as shown in FIGS. 9-12, ensures even pressing force on a food item positioned between the heating plates 14, 18.

Figure 13:
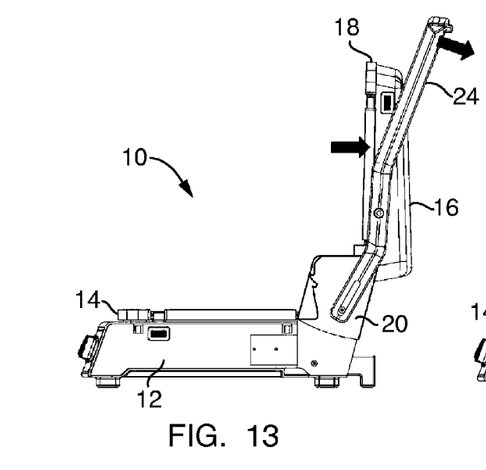
FIG. 13 is a side, elevational view of the cooking appliance of FIG. 1, illustrating the upper grill plate in a third raised position.
Figure 14:
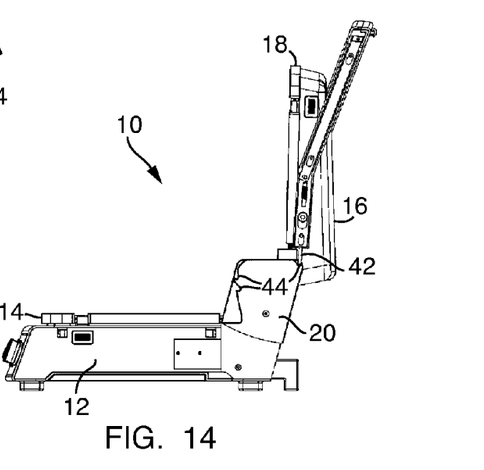
FIG. 14 is a side, elevational view of the cooking appliance of FIG. 1, illustrating the upper grill plate in a third raised and locked position.

As shown in FIGS. 13 and 14, as a user continues to lift up on the handle 14, the guiding wheels 34 enter the second, U-shaped portion 28 of the guide track 22 such that the upper housing 16 rotates with respect to the lower housing 12 to the substantially upright and open position shown therein. As will be readily appreciated, due to the arcuate shape of the second portion 28 of the guide track 22, the parallel registration of the upper heating plate 18 with respect to the lower heating plate 14 is no longer maintained. In this position, the projection 38 is in the rearward-most position in the slot 40. As best shown in FIG. 14 the upper housing 16 may be retained at this upright, open position via engagement of the pin 42 with another one of the positions stops 44, in the manner discussed below.

Figure 15:
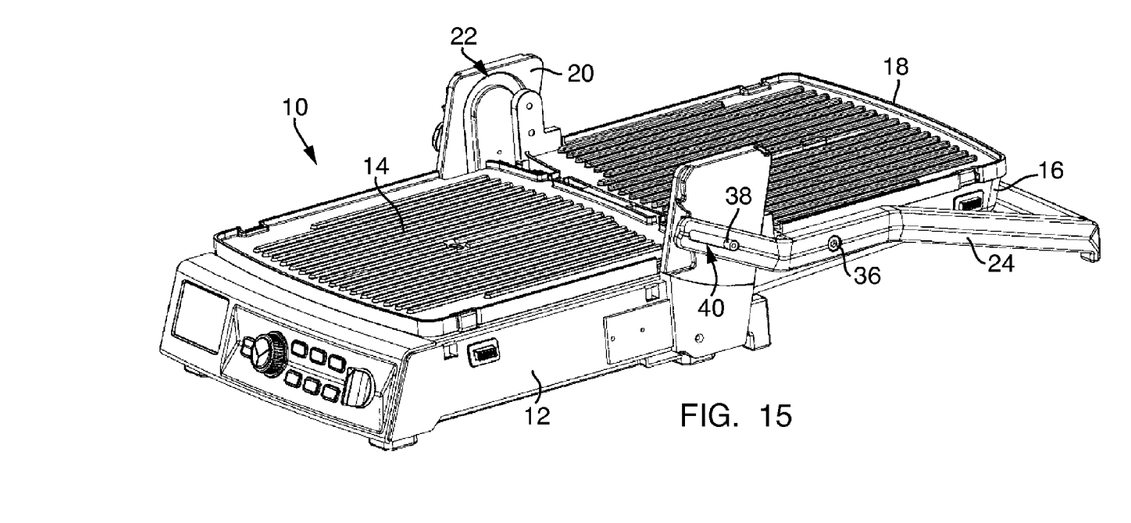
FIG. 15 is a side, elevational view of the cooking appliance of FIG. 1, illustrating the upper grill plate in a fully open position.
Figure 16:
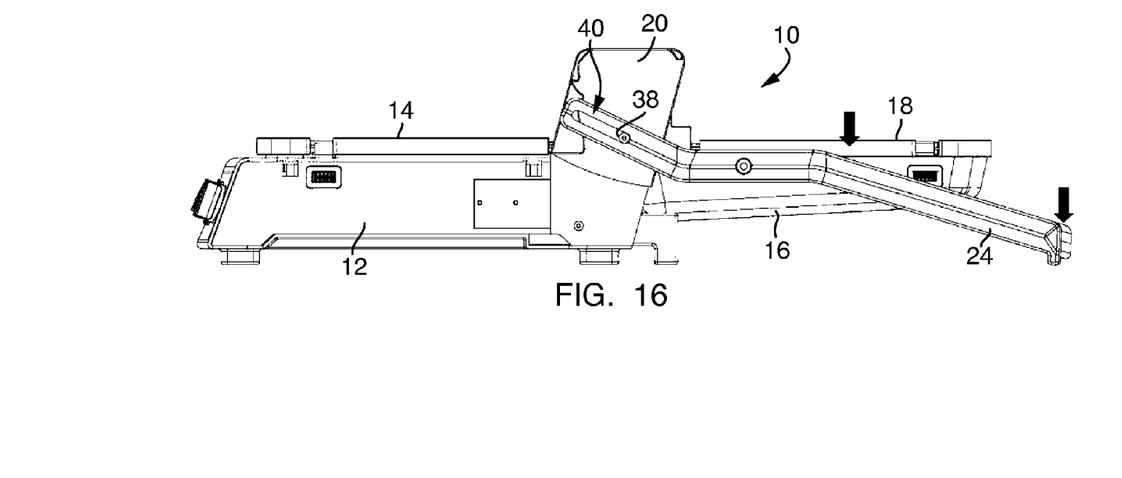
FIG. 16 is a side, elevational view of the cooking appliance of FIG. 1, illustrating the upper grill plate in a fully open and locked position.

Further rotation of the upper housing 16 along the guide track 22 causes the guiding wheels 34 to enter the substantially vertical third portion 30 of the guide track 22. As shown in FIGS. 15 and 16, this allows a user to orient the upper housing 16 in a fully open position, wherein the upper heating plate 18 is facing substantially upwards. In this position, the handle 24 functions to support the upper housing 16 in this upwards-facing position on a countertop or other surface.

As will be readily appreciated, the predefined 'n' shaped trajectory defined by the guide track 22 allows a user to selectively and conveniently position the upper heating plate 18 at various positions, in order to perform different heating or cooking functions. In particular, the cooking appliance 10 of the present invention may be selectively positioned by a user to provide for single or double side grilling, pizza cooking, etc. Moreover, the ability to elevate the upper housing 16 and upper heating plate 18 such that it remains substantially parallel to the lower heating plate 14 ensures even pressing force on a food items, thereby ensuring even heating and/or cooking. As will be readily appreciated, this is in contrast to traditional devices that feature an upper and lower housing connected via a rear hinge, which results in uneven pressing on food items therebetween. In addition, the 'n' shaped guide track 22 and the connection means between the handle 24 and the upper and lower housing 16, 12 provides for smooth and single hand opening and closing of the grill 10.

Figure 17:
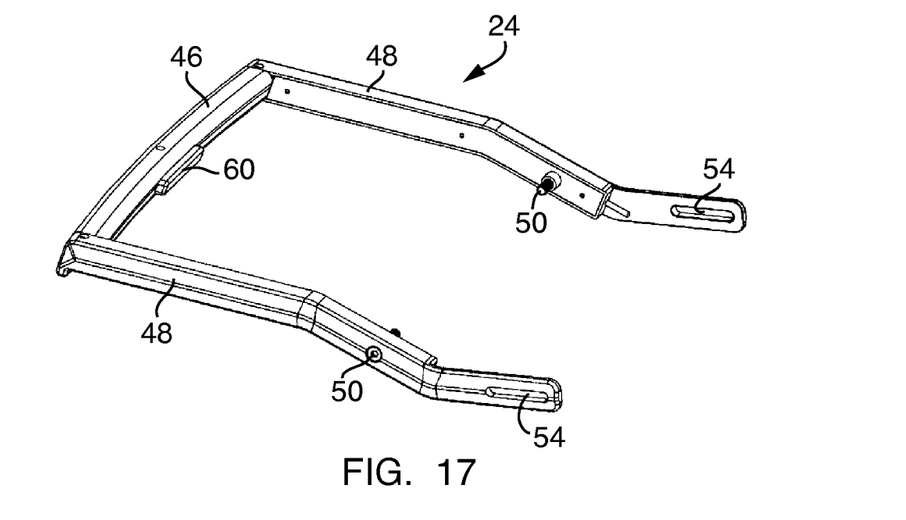
FIG. 17 is a perspective view of a handle of the cooking appliance of FIG. 1 according to an embodiment of the present invention.

Turning now to FIG. 17, the configuration of the handle 24 that allows for selective positioning of the upper housing 16 and upper heating plate 18 is shown. The handle 24 is generally U-shaped and includes a main handle member 46 and opposed leg members 48 arranged substantially perpendicular to, and extending from, the main handle member 46. The handle 24 is pivotally secured to the upper housing via pivot pins 50 (defining hinge 30) and is secured to the frame members 20 of the lower housing 12 via a pin 52 that translates in a slot 54 formed in distal ends of the leg members 48.

Figure 18:
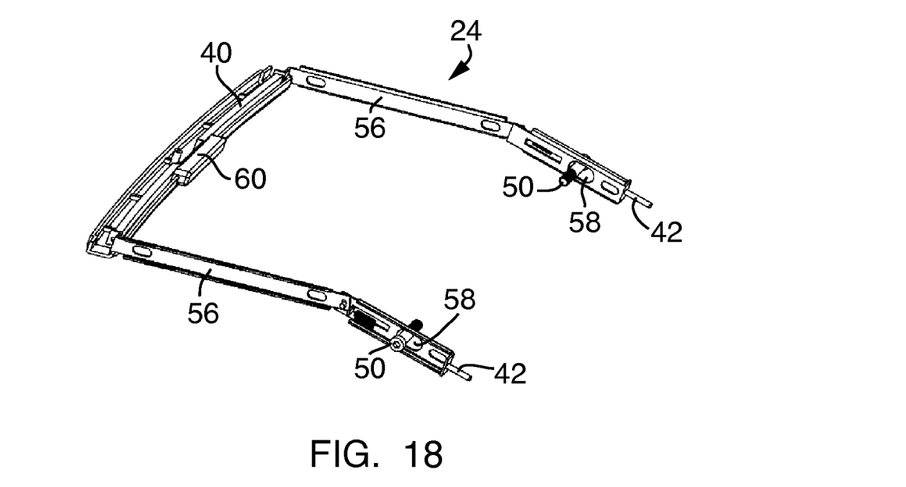
FIG. 18 is a perspective view of the handle of FIG. 17, illustrating the internal structure thereof.
Figure 19:
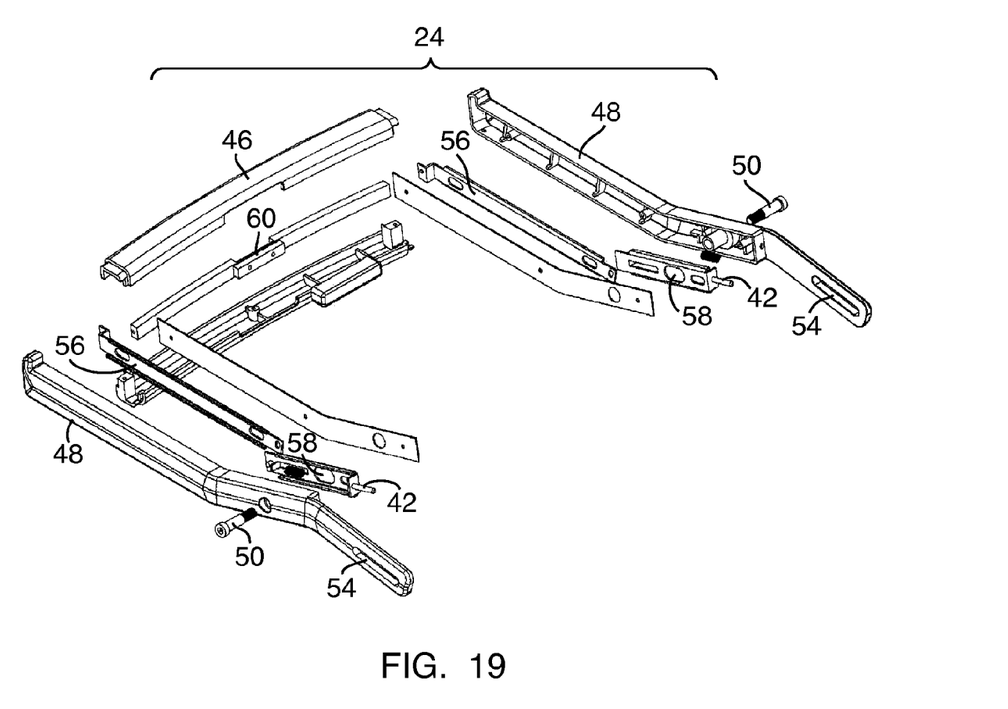
FIG. 19 is an exploded view of the handle of FIG. 17.

As best shown in FIGS. 18 and 19, the handle 24 also includes a pair of opposed pull rods 56 arranged interior to the leg members 48. A distal end of each pull rod 56, opposite the main handle member 46, includes a pull hole 58 and position pin 42, the function of which has been disclosed above and which will be hereinafter described in more detail below. Pivot pin 50 is accommodated within pull hole 58 and serves to limit travel of the pull rods 56.

Figure 20:
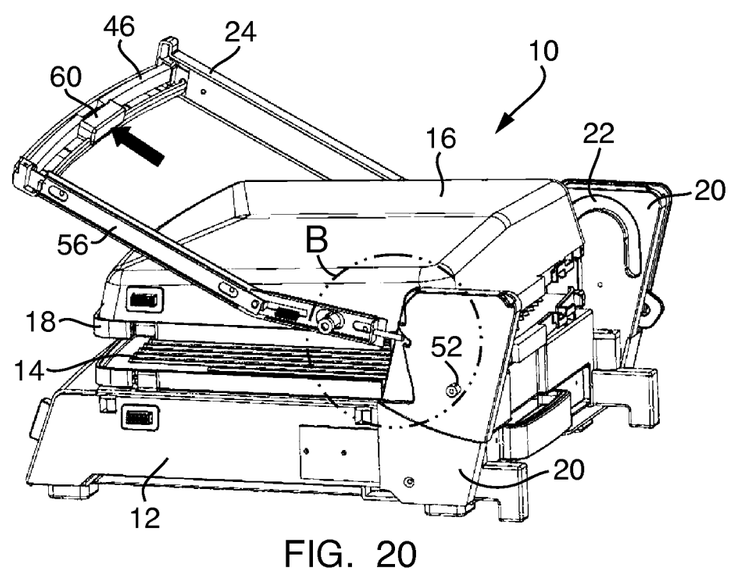
FIG. 20 is a perspective view of the cooking appliance of FIG. 1, illustrating the selective positioning of the upper housing and upper heating plate in an unlocked/freed position.
Figure 21:
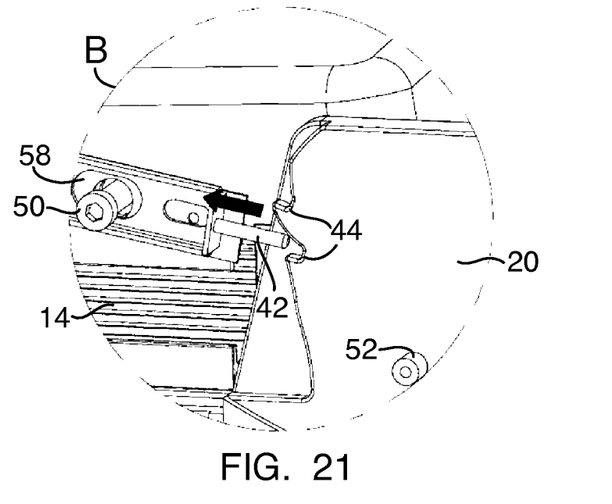
FIG. 21 is an enlarged, detail view of area B of FIG. 20.

As shown in FIGS. 20-23, an interior portion of each of the frame members 20 is formed with a plurality of angled, generally V-shaped position stops 44 that are configured to selectively engage the position pins 42 therein, as disclosed above. In operation, when a user depresses a lock button 60 on the handle 24, the pull rods 56 translate towards the main handle member 46 (via an interconnection between the button 60 and the pull rods 56), thereby retracting the position pins 42 from the position stops 44, in the direction of arrow C, as shown in FIG. 21. In this retracted position, as best shown in FIGS. 20 and 21, the upper housing 16 is 'unlocked' and can be freely raised or lowered by raising or lowering the handle 24.

Figure 22:
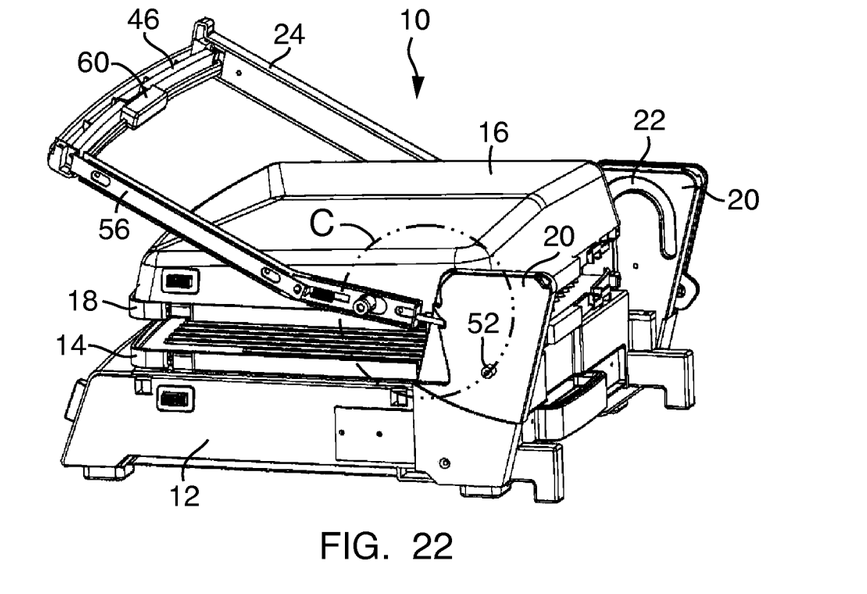
FIG. 22 is a perspective view of the cooking appliance of FIG. 1, illustrating the selective positioning of the upper housing and upper heating plate in locked/retained position.
Figure 23:
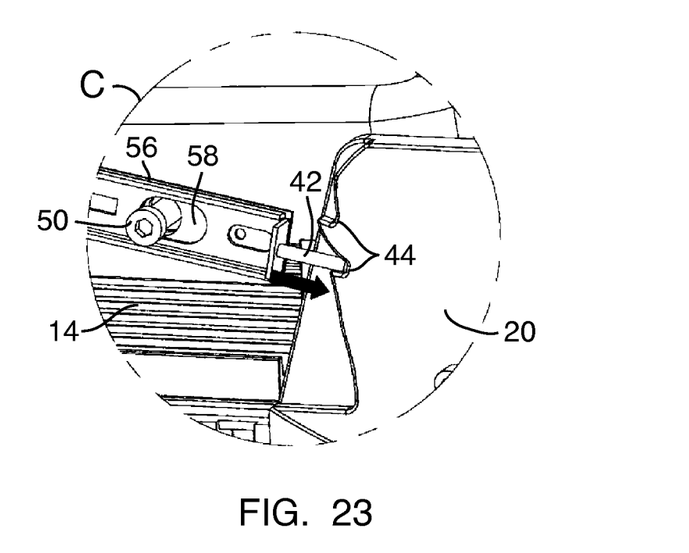
FIG. 23 is an enlarged, detail view of area C of FIG. 22.

Importantly, the lock button 60 includes a spring (not shown) that biases the pull rods 56 and position pins 42 towards a 'locked' position in which the position pins 42 are engaged with the position stops 44 when the button 60 is released. In particular, when a user releases the lock button 60, the pull rods 56 are biased away from the main handle member 46, thereby extending the position pins 42 toward the position stops 44, in the direction of arrow D, as shown in FIG. 23. In this extended position, as best shown in FIGS. 22 and 23, the upper housing 16 is 'locked' such that it cannot be lowered without again depressing the button 60 to release the position pins 42 from the position stops 44.

In this manner, the engagement of the position pins 42 with the position stops 44 enables a user to selectively position the upper housing 16 and upper heating plate 18 in desired spaced relation to the lower heating plate 14. In particular, the engagement of the pins 42 with the position stops 44 allows a user to position, and retain, the upper heating plate 18 a predetermined distance above the lower heating plate 14. As will be readily appreciated, this also prevents the upper housing 16 from closing shut against the lower housing 12 (or food item therebetween) due to the force of gravity when the handle 24 is released.

As shown in FIGS. 21 and 23, due to the angled nature of the position stops 44, the upper housing 16 may be moved upwards, but not downwards, without depressing the lock button 60. Accordingly, this arrangement allows a user to quickly raise the upper housing 16 and heating plate 18, as desired. Moreover, by automatically engaging the position stops 44 when the handle is released, thereby obviating the need for a user to manually hold the cooking appliance 10 in an open/raised position, both of a user's hands remain free for other tasks such as food preparation or the like.

While FIGS. 20-23 illustrate the cooking appliance 10 with two position stops 44, the cooking appliance may have any number of position stops 44 enabling the upper housing 16 to be retained at any number of predetermined positions corresponding to the number of position stops.

Importantly, the pins 42 are preferably spring biased towards the position stops 44 on the frame members 20. As a result, when a user opens the cooking appliance and releases the handle, the pins automatically engage the position stops to prevent the upper housing from forcefully slamming shut. Moreover, the contour of the position stops 44 enables a user to raise the upper housing without requiring a user to depress the button 60 button to retract the pins 42.

As discussed above, the cooking appliance 10, therefore, is easily and conveniently positionable, via single-hand operation, in a variety of positions, thereby enabling the cooking appliance 100 to operate in a variety of heating and cooking modes. In addition, vertical travel of the upper heating plate 18, rather than rotation about a rear hinge, ensures even pressing force on, and even cooking of, a food item.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   a lower housing having a first heating plate;
   a pair of opposed frame members operatively connected to said lower housing, said frame members including a guide track formed therein;
   an upper housing having a second heating plate and a guiding wheel on opposed sides of said upper housing, said guiding wheel being received in said guide track such that said upper housing is selectively movable along said guide track;
   a handle connected to said upper housing for effecting raising and lowering of said upper housing relative to said lower housing; and
   a positioning means for maintaining a spacing between said first heating plate and said second heating plate;
   wherein said handle includes a slot formed in distal ends of said handle; and
   said frame members each include an outwardly extending projection received in said slot.

2. The cooking appliance of claim 1, wherein:
   said guide track has a shape substantially resembling a lowercase 'n'.

3. The cooking appliance of claim 1, wherein:
   said guide track includes a substantially vertical first leg, an arcuate second leg, and a substantially vertical third leg.

4. The cooking appliance of claim 1, wherein:
   said positioning means includes a position stop formed on said lower housing and a position pin operatively connected to said handle and engageable with said position stop.

5. The cooking appliance of claim 4, wherein:
   said handle includes a pull rod connected to said position pin and a pushbutton associated with said pull rod, said pushbutton being depressible to retract said position pin from engagement with said position stop.

6. The cooking appliance of claim 4, wherein:
said position pin is spring-biased towards said position stop.

7. The cooking appliance of claim 2, wherein:
said upper housing is movable along said guide track to a position wherein said second heating plate is elevated above said first heating plate and said second heating plate is substantially parallel to said first heating plate.

8. The cooking appliance of claim 2, wherein:
said upper housing is movable along said guide track and retainable in a position wherein said second heating plate faces upwards and is adjacent to said first heating plate.

9. The cooking appliance of claim 2, wherein:
said upper housing is movable along said guide track and retainable in a position wherein said second heating plate is substantially upright.

10. A cooking appliance, comprising:
a lower housing having a first heating plate;
a pair of opposed frame members operatively connected to said lower housing, said frame members including a guide track formed therein; and
an upper housing having a second heating plate and a pair of guiding wheels oriented in stacked relationship on opposed sides of said upper housing, said pair of guiding wheels being received in said guide track such that said upper housing is selectively movable along said guide track.

11. A cooking appliance, comprising:
an upper housing;
a lower housing;
a positioning means for selectively adjusting and maintaining a spacing between said upper housing and said lower housing, said positioning means including a generally U-shaped handle having a pair of position pins extending from distal ends thereof, and a plurality of position stops associated with said lower housing, said position pins being selectively engageable with said position stops;
opposed frame members extending from said lower housing;
wherein said upper housing is movable along a guide track formed in said frame members, said guide track having a shape substantially resembling a lowercase 'n';
wherein said upper housing includes a pair of stacked projections extending from opposed sides thereof and received in said guide track; and
wherein said projections are movable along said guide track to selectively control a trajectory of said upper housing.

12. The cooking appliance of claim 11, wherein:
said upper housing is movable along said guide track to a position wherein an upper heating plate of said upper housing is elevated above a lower heating plate of said lower housing and said upper heating plate is substantially parallel to said lower heating plate.

13. The cooking appliance of claim 11, wherein:
said handle includes a button for effecting retraction and extension of said position pins away and towards said position stops.

14. The cooking appliance of claim 11, wherein:
said position pins are spring-biased towards said position stops.

15. The cooking appliance of claim 11, wherein:
said position stops are generally V-shaped and are oriented at a generally upwards angle.

16. The cooking appliance of claim 11, wherein:
said position pins are spring-biased towards said position stops; and
said button is depressible against said spring bias to retract said position pins from said position stops.

* * * * *